July 25, 1933.  A. K. KUSEBAUCH  1,919,435
TRAIN PIPE COUPLING
Filed Sept. 11, 1931  2 Sheets-Sheet 2
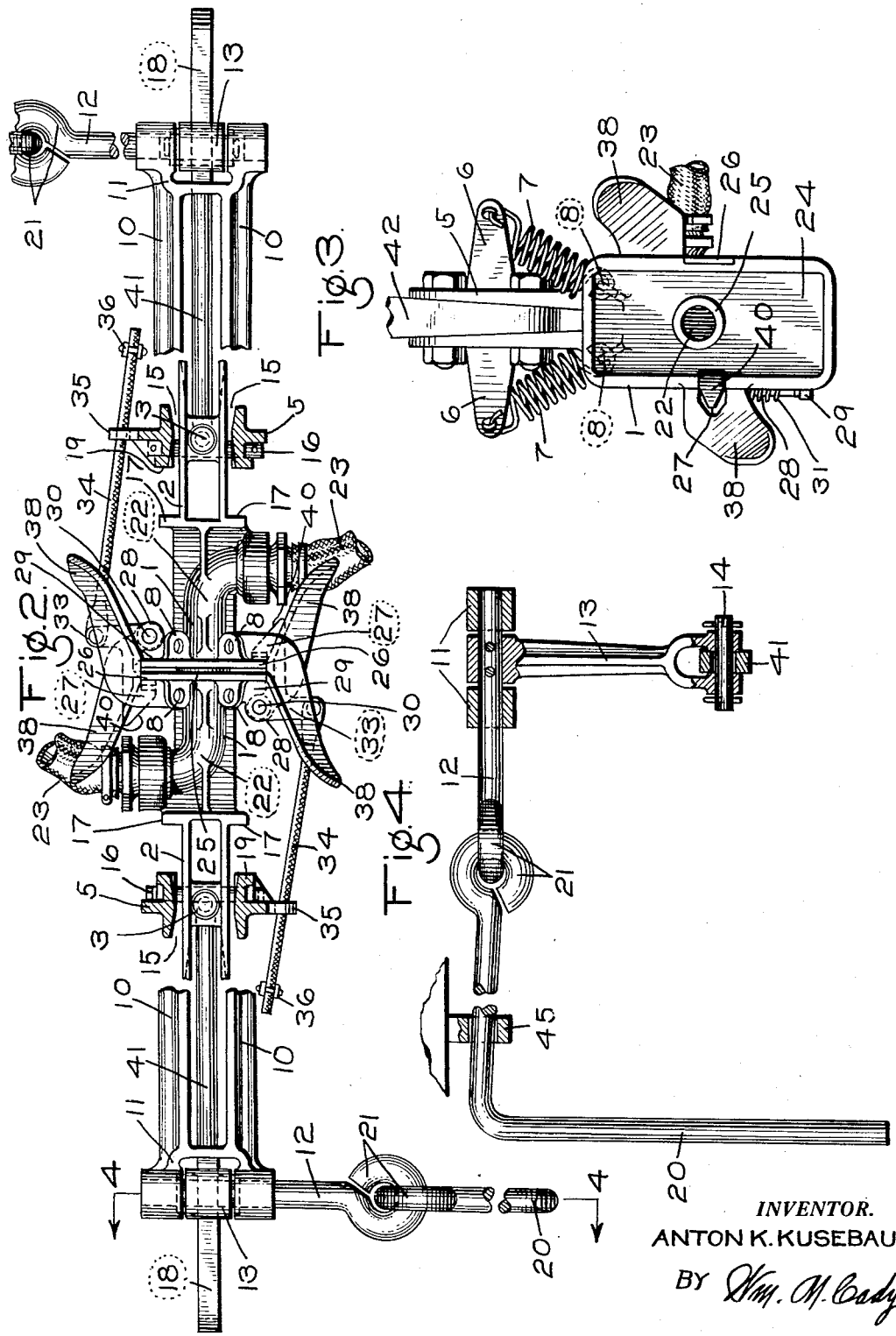
INVENTOR.
ANTON K. KUSEBAUCH
BY Wm. M. Cady
ATTORNEY.

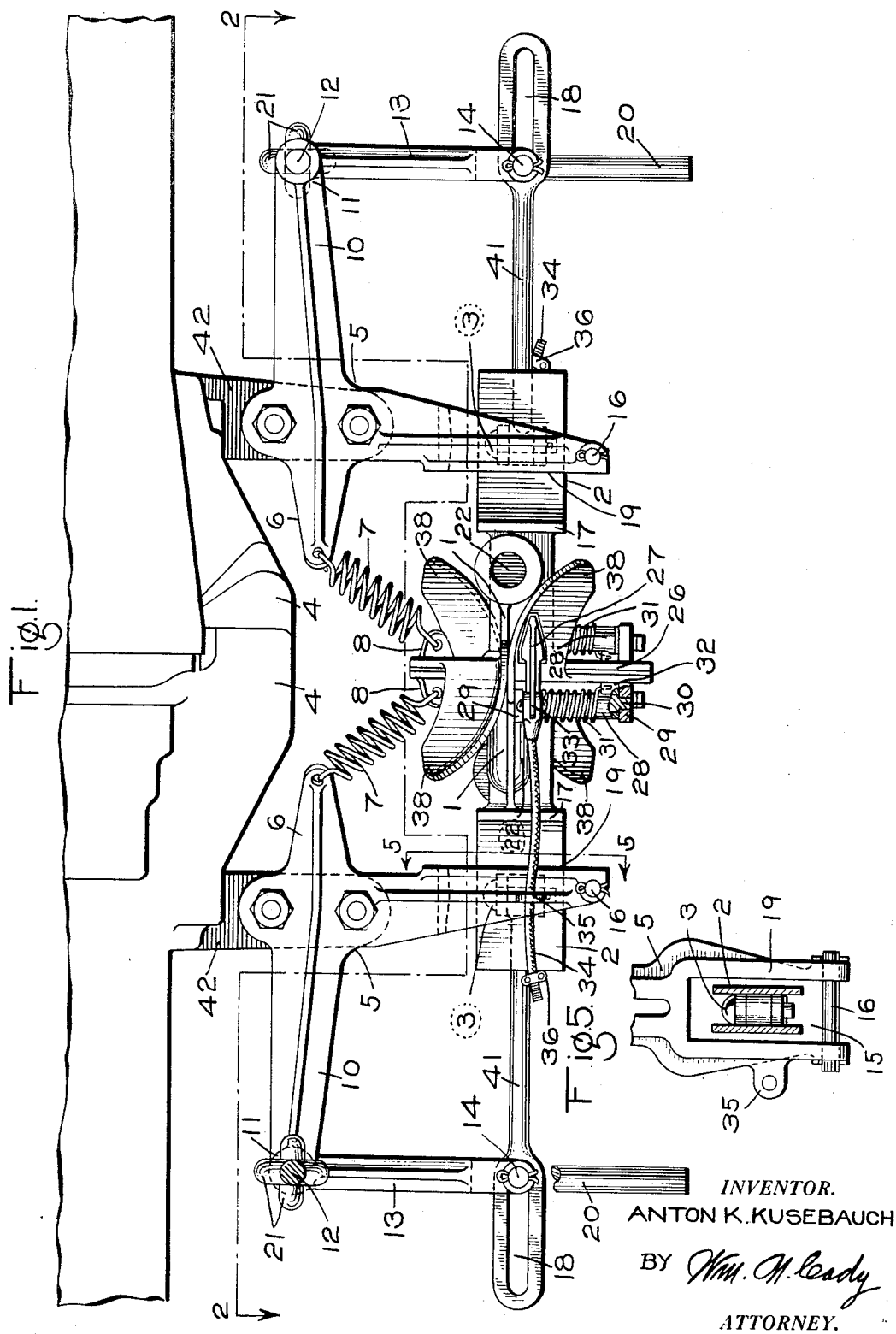

Patented July 25, 1933

1,919,435

UNITED STATES PATENT OFFICE

ANTON K. KUSEBAUCH, OF BELLEVUE, PENNSYLVANIA, ASSIGNOR TO THE WESTING-HOUSE AIR BRAKE COMPANY, OF WILMERDING, PENNSYLVANIA, A CORPORATION OF PENNSYLVANIA

TRAIN PIPE COUPLING

Application filed September 11, 1931. Serial No. 562,296.

This invention relates to couplings and more particularly to the type employed between the adjacent ends of two cars for establishing communication through a train pipe, such as the brake pipe of a train.

The principal object of my invention is to provide an improved train pipe coupling mechanism carried by the usual car coupler.

Other objects and advantages will appear in the following more detailed description of my invention.

In the accompanying drawings; Fig. 1 is a side elevation of a pair of train pipe coupling mechanisms embodying my invention and shown in the coupled position and suspended from the usual car couplers; Fig. 2 is a section taken on the line 2—2 of Fig. 1; Fig. 3 is an end view of the train pipe coupling looking toward the coupling face; Fig. 4 is a section taken on the line 4—4 of Fig. 2; and Fig. 5 is a section taken on the line 5—5 of Fig. 1.

As shown in the drawings, the train pipe coupling mechanism comprises a coupling head 1 having a rearwardly extending shank 2 to which is pivotally connected a member 41 by means of a pin 3, so as to permit lateral movement of the coupling head 1 relative to said member.

The train pipe coupling is disposed beneath the usual car coupler 4. Depending from the car coupler is a lug 42 to which is secured a bracket 5. The bracket 5 is provided with a pair of oppositely disposed arms 6 which project forwardly and flare outwardly. To the end of each of said arms is connected one end of a tension spring 7, the other end of each of said springs being connected to a suitable ear or lug 8 in the coupling head 1. The lugs 8 on the coupling head are positioned at opposite sides of the central vertical plane of the head and much closer to the plane than the ends of arms 6, so that, as shown in Fig. 3, the springs 7 hang at a considerable angle to the vertical plane, whereby the springs act to maintain the coupling head centralized laterally. The springs 7 are also so connected to the arms 6 and the coupling head 1 as to tend to maintain the coupling head in a position at the rear of the coupling plane, when not coupled to a counterpart coupling head.

The bracket 5 is also provided with two spaced rearwardly extending arms 10, the outer ends of which are joined by a yoke 11. Rotatably mounted in said yoke is an operating shaft 12, to which is secured a depending operating and supporting member 13. The member 13 is pivotally connected to the member 41 which is provided at its outer end with a slot 18 adapted to receive a pin 14 carried in the lower end of the member 13, so that the member 13 acts as a support for the coupling head.

The lower end of the bracket 5 is provided with an opening 15 adapted to freely receive the coupling head shank 2. The opening 15 is closed at its lower end by means of a pin 16 which is adapted to support the coupling head through the medium of the shank 2 in case the coupling head support springs 7 become broken.

The shank 2 is provided on each side with a flange or shoulder 17 adapted to engage the front face 19 of the side walls of opening 15 for defining the uncoupled position of the coupling head, to which position said coupling head is urged by the springs 7.

For moving the train pipe coupling from the uncoupled position, when it is desired to couple the head with a counterpart coupling, an operating handle 20 is provided. The operating handle 20, as shown more clearly in Fig. 4, comprises a rod having an eye formed at one end and adapted to be interlocked with a similar eye formed at one end of the shaft 12, so as to provide a universal joint 21 to permit the train pipe coupling to swing longitudinally with the car coupler relative to the operating handle 20. The rod is bent to form the handle 20 and is supported by a bracket 45 carried by the car.

The coupling head 1 is provided with a conduit 22 connected at one side of the coupling head to a flexible hose 23 leading to the usual train pipe, such as the brake pipe (not shown). The conduit 22 terminates in the face 24 of the coupling head and is there provided with a gasket ring 25 for engaging and effecting a leak-proof seal with a corresponding gasket ring in a counterpart coupling head.

The coupling head 1 is provided with a flange or shoulder 26 at one side and a latch 27 at the opposite side, so that the latch 27 of one coupling head will engage the shoulder 26 of a counterpart coupling head for operatively locking two counterpart coupling heads together.

The latch 27 is in the form of an arm secured to a sleeve 28. The sleeve 28 is rotatably mounted on a pin 30 which is carried by two spaced lugs 29 projecting from the side of the coupling head. Surrounding the sleeve 28 is a torsion spring 31, one end of which is secured to a lug 32 on the side of the coupling head, while the other end is secured to a lever arm 33 projecting from the sleeve 28, so that the spring 31 is adapted to rotate the sleeve 28 and latch 27 in such a direction as to effect automatic operation of said latch to lock two counterpart coupling heads together.

In order to operate the lever 33 so as to effect the tripping of the latch 27, preferably a flexible cable 34 is attached to said lever, so that when the cable is pulled out, the lever 33 operates to rotate the sleeve 28 and thereby cause the latch 27 to be released from engagement with the shoulder 26.

The cable 34 extends through a suitable opening in a lug 35 projecting from the side of the bracket 5. A collar 36 is secured to said cable at the rear of lug 35 and is adapted to be engaged by said lug for releasing the coupler latch 27 as two cars move apart after uncoupling of the car couplers has been effected.

The coupling head 1 is provided with two oppositely disposed forwardly projecting horns 38. These horns flare outwardly in such a manner as to guide two counterpart coupling heads into proper coupling relation in the act of coupling.

In operation, when two cars are being coupled together, the car couplers 4 are first coupled, in the usual manner, by the impact of the two cars coming together. At this time, the train pipe couplings will be separated due to the fact that when the train pipe couplings are uncoupled, springs 7 hold said couplings in a position to the rear of the coupling plane of the car couplers, in which position the coupling head stops 17 engage the front face 19 of the bracket 5.

After the car couplers 4 are interlocked, the trainman, at the side of the car, operates the handle 20 to couple the train pipe couplings. Assuming that the handle 20 of the coupling mechanism at the left of Fig. 1 is operated, the corresponding shaft 12 is rotated so as to swing the arm 13 to the right and thereby the member 41 is shifted to the right so as to move the left hand coupling head across the coupling plane of the car couplers and into engagement with the counterpart coupling head at the right. As the one coupling head approaches the other, the horns 38 engage the counterpart head and horns and guide the two heads into the proper coupling relation, in the well known manner.

When the coupling head at the left is brought into engagement with the coupling head at the right, the counterpart conduit gasket rings 25 in the coupling face of the coupling heads engage and are compressed to effect a leak-proof seal, and at substantially the same time, the tapered nose 40 of latch 27 slides over flange 26 of the counterpart coupling head and permits the torsional force of spring 31 to snap said latch into locking engagement with flange 26 of the counterpart coupling head.

After the coupling head at the left is locked in engagement with the coupling head at the right, the trainman releases handle 20 which then returns to its vertical position, due to gravity. The springs 7 of the left hand coupling head, having been tensioned by the movement of the head to engage the coupling head at the right, then exert a pull on the coupling heads to move same to the position shown in Fig. 1, in which the coupling plane of the train pipe couplings coincide with the coupling plane of the car couplers. The springs 7 of the opposing coupling heads will then act to yieldingly maintain the heads in this position.

The member 41 being pivotally connected through pin 3 with the coupling shank 2, permits lateral movement of the coupling head relative to said member, while the arm 13 being pivoted to permit longitudinal swinging movement of the member 41, it will be evident that the coupling heads are free to move laterally and longitudinally to allow for changes in position due to rounding curves and the like.

The train pipe couplings may be uncoupled either automatically or manually. If it is desired to effect automatic uncoupling, the car couplers 4 are first unlocked in the usual manner, after which the movement of the cars, as they separate, relative to the train pipe couplings moves the lug 35 on the bracket 5 into engagement with collar 36. As the cars continue to move apart, the collar 36 operates to pull the cable 34 and release the latch 27 from shoulder 26 on the counterpart coupling head, after which the springs 7 pull the coupling head rearwardly to the uncoupled position in which the flanges 17 on the coupling shank 2 engage the front face 19 of the bracket 5.

In the uncoupling operation just described, it will be evident that the latch 27 on both of the coupling heads will be operated and released at substantially the same time.

If it is desired to manually uncouple the train pipe couplings, the trainman simultaneously pulls out both of the cables 34 of the coupled coupling heads, so as to effect the release of the latch 27 of both coupling heads simultaneously.

It will now be evident that I have provided an improved train pipe coupling mechanism in which the train pipe coupling is wholly carried by the car coupler and which may be manually moved to coupling position from the side of a car by means which are carried by the car.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. The combination with a car coupler and a train pipe coupling having a head portion and a shank portion, of means for wholly supporting said train pipe coupling from said car coupler comprising a bracket carried by said car coupler, an element secured to said bracket and provided with rearwardly and forwardly extending portions, springs connected to the forwardly extending portion and secured to said head portion, an arm pivotally mounted on said rearwardly extending portion, and movable only in a direction parallel to the longitudinal axis of the car coupler, and a member secured to said shank portion and supported by said arm.

2. The combination with a car coupler disposed at the end of a car and a train pipe coupling movable from an uncoupled position to a position for coupling with a counterpart coupling, of resilient means carried by the car coupler and connected to the train pipe coupling for supporting said train pipe coupling, an additional support member carried by said car coupler and pivotally connected to said train pipe coupling, and means connected to said additional support member and operative manually to move said coupling from the uncoupled position to the position for coupling with a counterpart coupling.

3. The combination with a car coupler disposed at the end of a car and a train pipe coupling movable from an uncoupled position to a position for coupling with a counterpart coupling, of resilient means carried by the car coupler and connected to the train pipe coupling for supporting said train pipe coupling, an additional support member carried by said car coupler and pivotally connected to said train pipe coupling, and means connected to said additional support member and operative manually to move said coupling from the uncoupled position to the position for coupling with a counterpart coupling, said means being rotatably carried by the car.

4. The combination with a car coupler disposed at the end of a car and a train pipe coupling movable from an uncoupled position to a position for coupling with a counterpart coupling, of resilient means carried by the car coupler and connected to the train pipe coupling for supporting said train pipe coupling, an additional support member carried by said car coupler and pivotally connected to said train pipe coupling, a universal joint connected to said additional support member, a handle connected to said universal joint and operative manually to move said coupling from the uncoupled position to the position for coupling with a counterpart coupling, and a bracket associated with the car for supporting said handle.

ANTON K. KUSEBAUCH.